US011123939B2

(12) United States Patent
Chan et al.

(10) Patent No.: US 11,123,939 B2
(45) Date of Patent: Sep. 21, 2021

(54) FINGER BALER

(71) Applicants: Chung Wah Chan, Houston, TX (US); Ricardo J. Perez, Houston, TX (US)

(72) Inventors: Chung Wah Chan, Houston, TX (US); Ricardo J. Perez, Houston, TX (US)

(73) Assignee: Avangard Innovative, LP, Houston, TX (US)

( * ) Notice: Subject to any disclaimer, the term of this patent is extended or adjusted under 35 U.S.C. 154(b) by 444 days.

(21) Appl. No.: 15/250,384

(22) Filed: Aug. 29, 2016

(65) Prior Publication Data

US 2018/0056617 A1  Mar. 1, 2018

(51) Int. Cl.
*B30B 9/30* (2006.01)
*G01G 19/52* (2006.01)
(Continued)

(52) U.S. Cl.
CPC .............. *B30B 9/301* (2013.01); *B30B 9/305* (2013.01); *B30B 9/3021* (2013.01);
(Continued)

(58) Field of Classification Search
CPC .............. A01F 15/101; A01F 2015/102; A01F 2015/105; A01F 2015/0891; B30B 9/301;
(Continued)

(56) References Cited

U.S. PATENT DOCUMENTS 3,934,394 A * 1/1976 Garrison .............. A01D 85/004
56/344
5,551,218 A   9/1996 Henderson et al.
(Continued)

FOREIGN PATENT DOCUMENTS

WO   1999/037474 A1   7/1999
WO   WO-03031167 A1 * 4/2003 .............. F16P 3/147

OTHER PUBLICATIONS

International Search Report & Written Opinion (PCT/US2017/045315), dated Oct. 30, 2017.

*Primary Examiner* — Shelley M Self
*Assistant Examiner* — Jared O Brown
(74) *Attorney, Agent, or Firm* — Gregory L. Porter; Hunton Andrews Kurth LLP

(57) ABSTRACT

Disclosed are embodiments of a system and method for baling recyclable materials and managing the baling of recyclable materials. The apparatus for baling includes a finger baler for continuous compressing and baling recyclable materials, a scale, label printer, and a processor. Certain embodiments further comprise at least one digital camera, RFID dispenser, and internet connection that allows the processor to transmit collected data to a remote database for further analysis.

The disclosed method for baling recyclable materials comprising the steps of continuously adding and compressing materials; forming a completed bale; weighing the bale automatically using a digital scale operably connected to the processor; recording the bale weight automatically; and printing a label. Additionally, the method may comprise inputting information and/or automatically recording data, and/or automatically transmitting the data associated with a bale to a remote database.

14 Claims, 13 Drawing Sheets

(51) Int. Cl.
  *G01G 23/36* (2006.01)
  *G01G 19/08* (2006.01)
(52) U.S. Cl.
  CPC ........... *B30B 9/3082* (2013.01); *G01G 19/08* (2013.01); *G01G 19/52* (2013.01); *G01G 23/36* (2013.01)
(58) Field of Classification Search
  CPC ......... B30B 9/30; B30B 9/3021; B30B 15/30; G01G 19/52; G01G 23/36
  USPC .............................. 100/179, 188 R, 189, 220
  See application file for complete search history.

(56) References Cited

U.S. PATENT DOCUMENTS

| | | | |
|---|---|---|---|
| 6,474,228 B1* | 11/2002 | Leupe | A01F 15/04 100/100 |
| 7,146,294 B1 | 12/2006 | Waitkus, Jr. | |
| 7,406,402 B1 | 7/2008 | Waitkus, Jr. | |
| 7,743,699 B1* | 6/2010 | Freeman | A01F 15/0816 100/73 |
| 7,957,937 B2 | 6/2011 | Waitkus, Jr. | |
| 8,362,903 B2 | 1/2013 | Lindh et al. | |
| 10,021,859 B1* | 7/2018 | Miller | A01K 61/001 |
| 2005/0065640 A1 | 3/2005 | Mallett et al. | |
| 2005/0197175 A1* | 9/2005 | Anderson | A01B 69/008 460/1 |
| 2012/0029980 A1* | 2/2012 | Paz | B07C 5/34 705/14.1 |
| 2012/0204740 A1 | 8/2012 | Bergmann | |
| 2012/0266763 A1* | 10/2012 | Foster | A01F 15/0715 100/2 |
| 2014/0156541 A1* | 6/2014 | Waite | B65B 13/20 705/308 |
| 2016/0014965 A1 | 1/2016 | Naeyaert et al. | |
| 2016/0023417 A1* | 1/2016 | Hanson | B30B 9/3007 100/99 |
| 2016/0088798 A1* | 3/2016 | Lang | A01F 15/0825 56/341 |
| 2017/0202150 A1* | 7/2017 | Smith | A01F 15/0705 |

* cited by examiner

FINGER BALER

FIELD

Embodiments described herein are employed more continuous feeding of material into a baler. Embodiments allow for increased efficiency when handling recyclable materials and increased or automatic data gathering from a baling device.

BACKGROUND AND SUMMARY

The disclosed invention facilitates increased or continuous feeding of recyclable materials into a baler. Embodiments of the disclosed system will also include smart technology, which allows data collection to be performed with little to no human interaction.

Traditional balers are typically either vertical or horizontal balers. A typical vertical baler, as shown in FIG. 1, has the significant benefit of requiring comparatively little square footage due to its smaller footprint. A horizontal baler typically has a much larger footprint than a vertical baler but allow faster material processing. This is due, in part, to the batch process required by traditional vertical balers. Typical vertical balers must be loaded with an initial batch of material, then that material can be compressed. Only after the first batch of material has been compressed and the compressing plate has been removed from the feeding tube can additional material be added. This process requires significant time and labor resources.

A solution is to create a new class of baler. Disclosed embodiments use a linkage system commonly driven by hydraulic pistons to create a cam movement of press jaws or fingers in lieu of the traditional one directional press plate used commonly in vertical balers. The end result is a press system with a continuous opening to accept new incoming material, and significantly smaller footprint than a traditional horizontal baler.

Disclosed embodiments also allow automatic data gathering from a baler via information technology, so that collected data can be used to increase material handling efficiency by eliminating scaling of bale weights via a floor scale, eliminate human hand writing recording errors, eliminate wrong material reporting, eliminate false data, add visibility of balers productivity, add visibility to knowing who baled what material, when material is baled, at which location material is baled, etc.

Traditionally, each of the above steps has been addressed by a human operator manually recording notes. The traditional system is generally susceptible to both accidental and intentional human error. This error frequently leads to inaccurate reporting of bale weight and type of material baled. This also leads to inconsistent bale weights, lack of inventory control, and false records.

Disclosed embodiments address these problems by integrating weight sensors, computer processors, cameras and other sensing devices with the disclosed finger baler. The detected weight may then be processed through a mathematical algorithm and pushed to a cloud database. At that point, a local computer can capture the weight data as well as an image of product baled and print a label, barcode, QR Code, RFID label and/or other tracking device to be affixed to the bale.

When recyclable materials are collected and baled, disclosed embodiments allow for efficient, accurate labeling of each bale with the weight, type of material, baling location, bar code tracker and other useful information. Embodiments also allow this information to be transferred to a database where the information may be used for auditing and optimization of the total process. Access to this data will help users better manage their recycling operations. This will also help users compare the quantity of recycled materials to the total amount of materials available to be recycled and may reveal additional revenue streams.

Potential benefits of the disclosed embodiments relate to increased or continuous feeding of materials into a baler; automatic weighing of finished bales; eliminating multiple trips to obtain weight; instant and accurate inventory report on baled goods; eliminating the need for a human weight report; eliminating human hand writing errors; and/or eliminating inventory errors.

Additional benefits relate to allowing an owner to set the tolerance of bale weight for each type of material; letting an owner know when baling wires are running low; letting an owner know when the baler needs service; letting an owner know when full load is close, facilitating the pre-scheduling of load pick up; customized alerts can be sent to an owner (and multiple other designated personnel) based on predefined criteria; multi-layer password protection; optional camera to capture images of the material being baled; and/or an optional printer to print a bale label with bar codes and all relevant information of the bale content.

DETAILED DESCRIPTION

Figure 1:
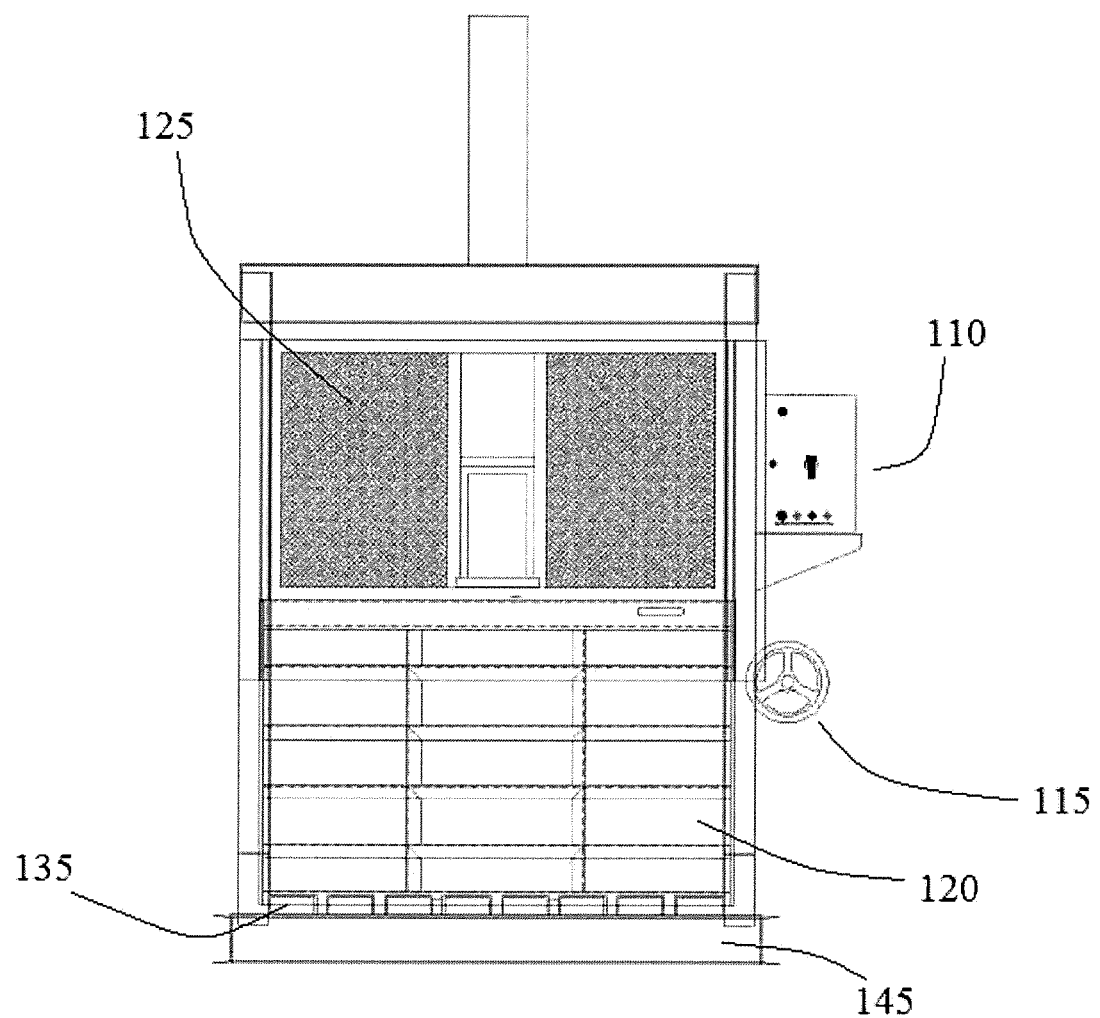
FIG. 1 shows a front view of a traditional vertical baler.

Disclosed embodiments allow continuous feeding of material into a baler 101 as well as automatic data gathering from the baler 101 via integrated computer processors and sensors. The disclosed finger baler 101 comprises a feeding tube 109 where the material to be baled is loaded. The feeding tube 109 is typically rectangular in shape and approximately 3 feet wide by 4 feet long, but the feeding tube 109 may be any size and shape depending on the application. The feeding tube 109 is typically located at the top of the baler for vertical balers. The feeding tube 109 may help direct the material to be baled, prevent overly large pieces of material from being fed into the baler, and/or simply provide a location to load material into the baler. In some embodiments, the feeding tube 109 is distinct from the body of the baler, but in many embodiments the feeding tube 109 extends to the bottom of the baler and comprises what may be referred to as the baling chamber, (i.e., where the materials are physically compressed). The feeding tube 109 is not limited to a separate or additional feature that is distinct from the baling chamber or the baler in general. In most embodiments, the material being baled will enter the baler through the feeding tube 109, remain in the feeding tube 109 as it is being compressed, and then exit the baler through the door 120 located at the bottom of the feeding tube 109. The feeding tube 109 is most commonly made of metal but may be made of any material sufficiently strong to contain the material as it is being compressed.

As material is being loaded, the finger baler's fingers 106 compress the material. The fingers 106 are often thin metal protrusions that are used to compress the material though the fingers can be made of any suitable material, such as polymer. While each individual finger may be as thin as ¼ inch wide, or even thinner, most embodiments will use fingers 106 that are between 1 and 6 inches wide. Some fingers 106 may be as wide as 8 inches, 10 inches, 12 inches, or wider. When a plurality of fingers 106 are used, they can provide a relatively even compression across the full area to be compressed. The plurality of fingers 106 is typically arranged so that the individual fingers extend substantially horizontally into the feeding tube and are generally evenly spaced from one another. The fingers 106 typically extend close to the edges of the feeding tube 109 on all sides. As the fingers 106 extend closer to the edges, the possibility of material squeezing through the gaps in between the edge of the feeding tube 109 and a finger is reduced. The fingers 106 may be arranged in any configuration and be of any size. The configuration, size, shape, arrangement, material, and number of fingers may all be modified based on the material to be compressed and the operating conditions of the baler.

The fingers 106 compress the materials and may then be extracted laterally or substantially laterally from the feeding tube 109 through finger slots 107 in a wall of the feeding tube 109. The finger slots 107 are generally areas that have been cut out or otherwise removed from the wall of the feeding tube 109 or baler. The slots 107 allow the fingers 106 to be inserted and retracted from the feeding tube 109 and/or baler in order to compress material and then be laterally extracted. The finger slots 107 are typically only slightly wider than the fingers 106 themselves and extend vertically to allow the fingers 106 to travel from a higher portion of the feeding tube 109 to a lower portion of the feeding tube 109 as the fingers 106 compress the material. The finger slots 107 can be any width and length depending on the design of the baler, but most embodiments will employ narrow vertical slots 107 that are must longer than they are wide. These slots 107 will typically run vertically along the feeding tube wall. In some embodiments, there may be a gasket material that prevents smaller pieces of material from falling through the finger slots 107 as the material is being compressed. This gasket material may be rubber, polymer, metal or any other suitable material that allows the fingers 106 to travel substantially the entire length of the finger slot 107 while generally preventing material from falling through the slots 107. Most finger slots 107 will be closed on all four sides, but in some embodiments, the finger slots 107 may extend the full length of the feeding tube 109, thereby creating an opening at the top and/or bottom of the feeding tube 109 that allows the fingers 106 to be inserted into the feeding tube 109 by being lowered vertically. In these instances the feeding tube wall may actually be several independent pieces, but these independent pieces will still function in concert as a single wall for containing the material as it is being compressed.

In certain embodiments, the fingers 106 may be rotated once they have been inserted into the feeding tube 109. In these embodiments, fingers 106 that are relatively wide and flat may be used in order to provide a more even compression of the material to be baled. The fingers 106 in these embodiments may be substantially wider than the finger slots 107, but may still be inserted into the feeding tube 109 through the finger slots 107 as long as the fingers 106 are thin enough is at least one orientation to be inserted and extracted through the finger slots 107. Once the fingers 106 have been inserted in a vertical orientation, the fingers 106 may be rotated into a substantially horizontal orientation so that the larger surface area of the fingers 106 may be taken advantage of. Once the compression is complete, the fingers 106 can be rotated again, back to a substantially vertical orientation, thereby allowing the fingers 106 to be extracted through the relatively narrow finger slots 107.

The extraction methods discussed above allows additional material, which may have been added while the fingers 106 were compressing the original volume of material, to settle on top of the compressed original batch of material. This lateral extraction process allows additional material to be loaded into the baler even as the fingers 106 are compressing previously loaded material. After the fingers 106 are extracted, the fingers 106 may be repositioned at the top of the feeding tube 109 by laterally inserting the fingers 106 into the feeding tube 109 at the upper portion of the tube through the finger slots 107, rotating the fingers 106 such that they rotate down onto the feeding tube 109 from the top, or any other method of returning the fingers 106 to the upper portion of the feeding tube 109 so that additional material can be compressed.

Disclosed embodiments are suitable for compressing all materials that may be baled using a typical vertical or horizontal baler although minor adjustments may be required depending on the properties of the material and the specific application. As an example only, larger boxes or pieces of paper products may be compressed by narrower fingers 106 or fingers 106 with a greater distance between individual fingers while smaller pieces or paper or aluminum cans may require wider fingers 106 or a smaller distance between individual fingers in order to be properly compressed. Additionally, modifications to the cam mechanism 108, feeding tube 109, and other baler components may be necessary to optimize a baler for a particular material. The pressure applied by the compressing fingers 106 may be adjusted to accommodate various materials and desired bale densities. For example purposes only, compressing tires may require significantly greater pressure than compressing paper products in order to form a complete bale. These modifications are readily understood by one skilled in the art.

As a comparison, traditional vertical balers, as shown in FIG. 1, typically use a piston to press a large plate down onto material in order to compress it. Then the piston and plate must be raised back up in order to allow additional material to be added to the baler. The step of raising the piston creates a significant amount of time in which the operator is waiting on the plate to be withdrawn from the feeding tube 109 so that additional material can be added. Additionally, if materials were added to the baler while the piston was actively compressing previously added materials, the newly added materials would be lifted by the retracting plate and likely fall out of the feeding tube as the piston was raised. This would require the operator to collect the materials and load them into the baler once the piston was elevated out of the way.

Figure 2:
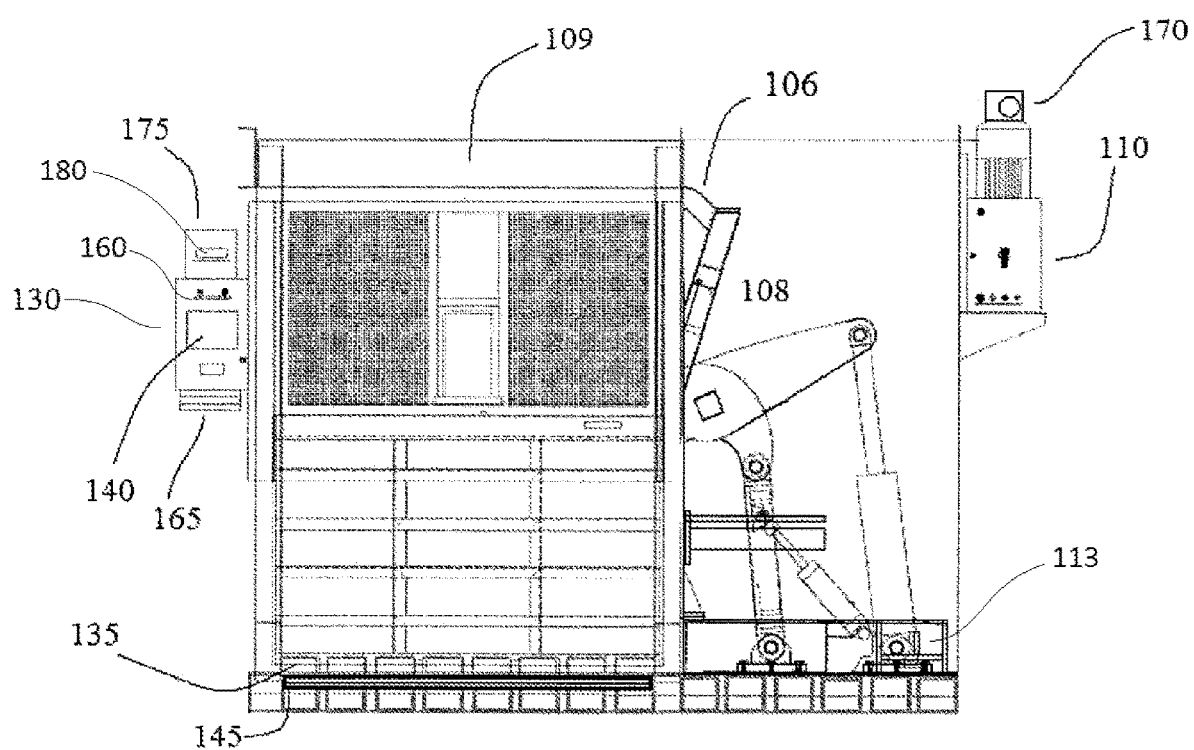
FIG. 2 shows a front view of an embodiment of a smart finger baler.

FIG. 2 shows a potential embodiment of a smart finger baler. The motor 113 driven cam mechanism 108 drives the movement of the fingers 106. Materials may be added to the feeding tube 109 and are then compressed by the fingers 106, as is discussed throughout.

Compressing fingers 106, as opposed to a piston or plate, can be withdrawn from the path of material by extracting the fingers 106 laterally through finger slots 107 in the wall 111 of the feeding tube 109, thus allowing continuous loading of material without the need to wait for the fingers 106 or plate to be raised out of the feeding tube 109.

Figure 3:
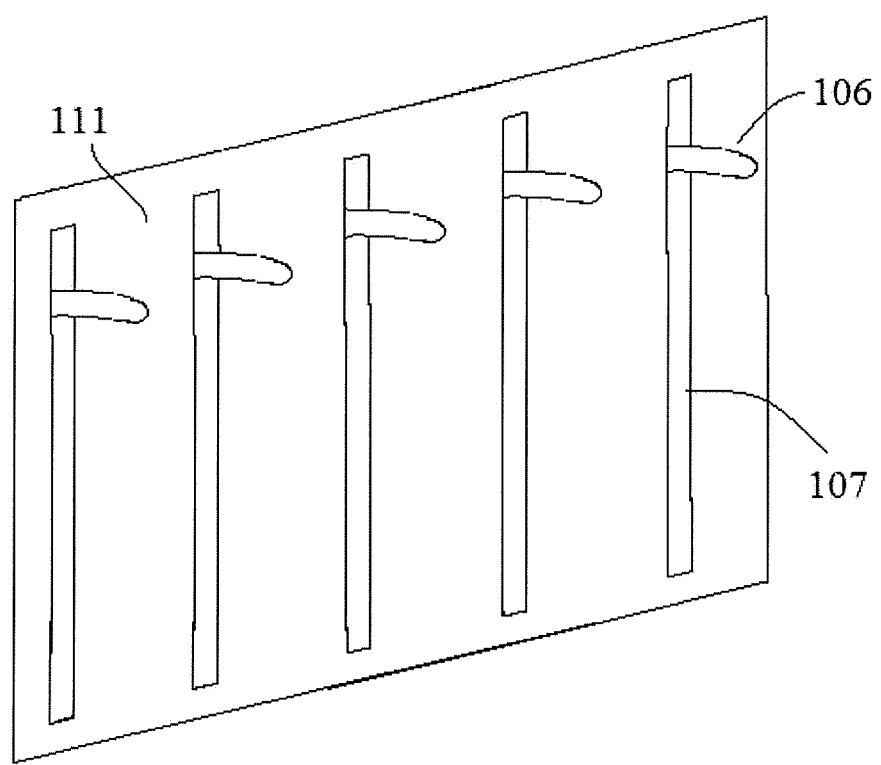
FIG. 3 depicts a potential embodiment of a feeding tube wall with finger slots and fingers beginning to be laterally inserted into the feeding tube.

FIG. 3 through FIG. 6 show the movement of fingers 106 in one potential embodiment. FIG. 3 shows the fingers 106 being laterally inserted through the finger slots 107 in the feeding tube wall 111. The fingers 106 are initially inserted near the top of the feeding tube.

Figure 4:
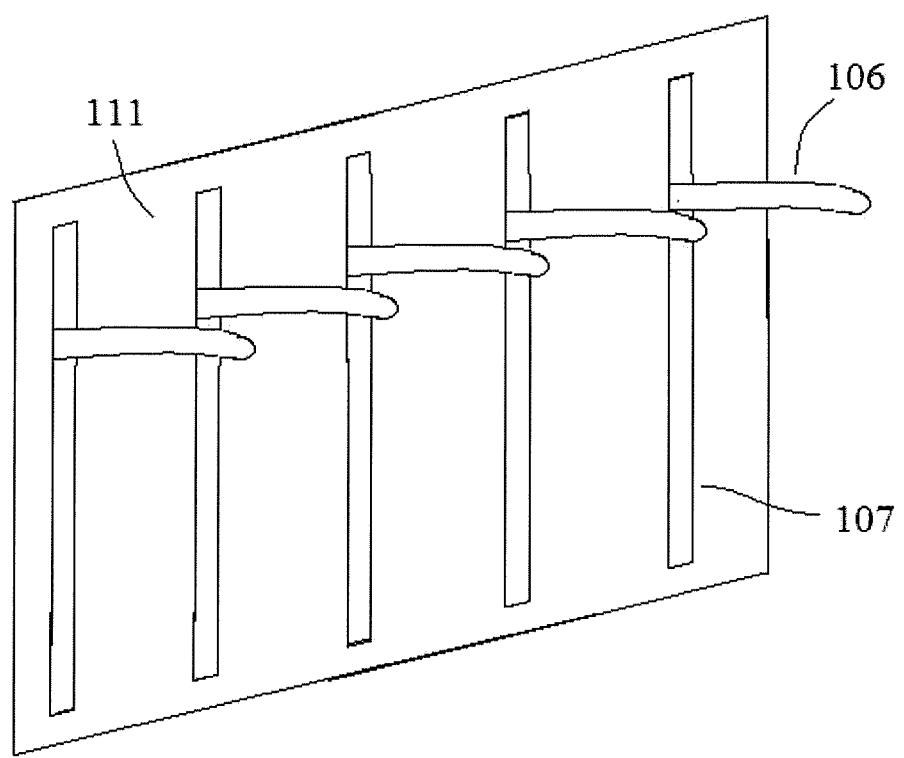
FIG. 4 depicts a potential embodiment of a feeding tube wall with finger slots and fingers laterally inserted into the feeding tube.

FIG. 4 shows the fingers 106 fully inserted through the feeding tube wall 111 and starting to lower in order to compress material in the feeding tube 109. The material being compressed is not shown in the figures for the sake of clarity.

Figure 5:
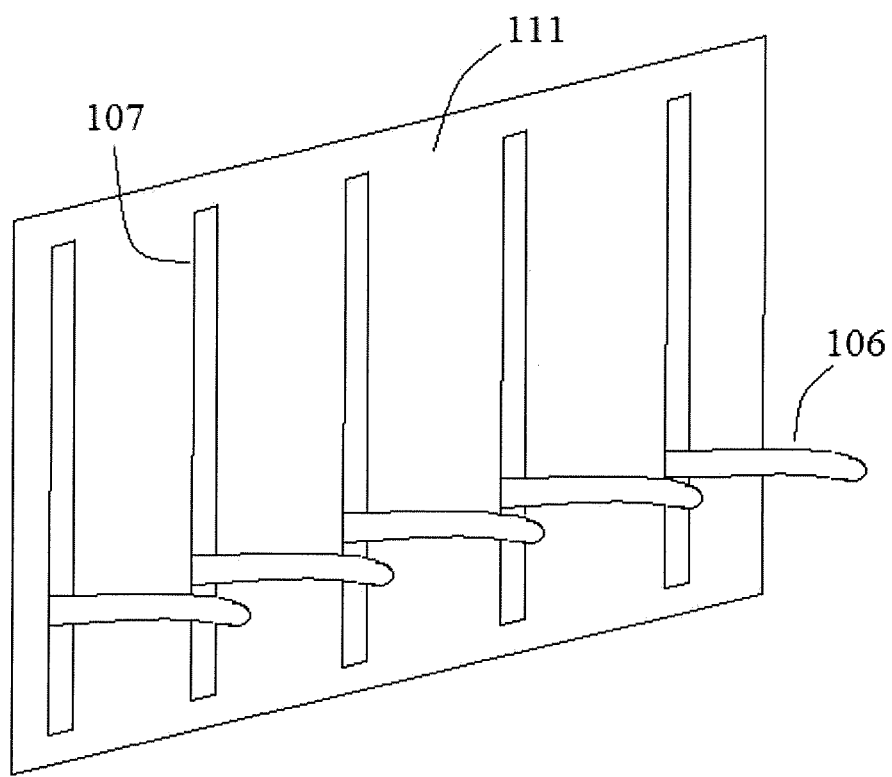
FIG. 5 depicts a potential embodiment of a feeding tube wall with fingers lowering to compress material. (Material not shown).

FIG. 5 shows the fingers 106 being lowered and compressing material.

Figure 6:
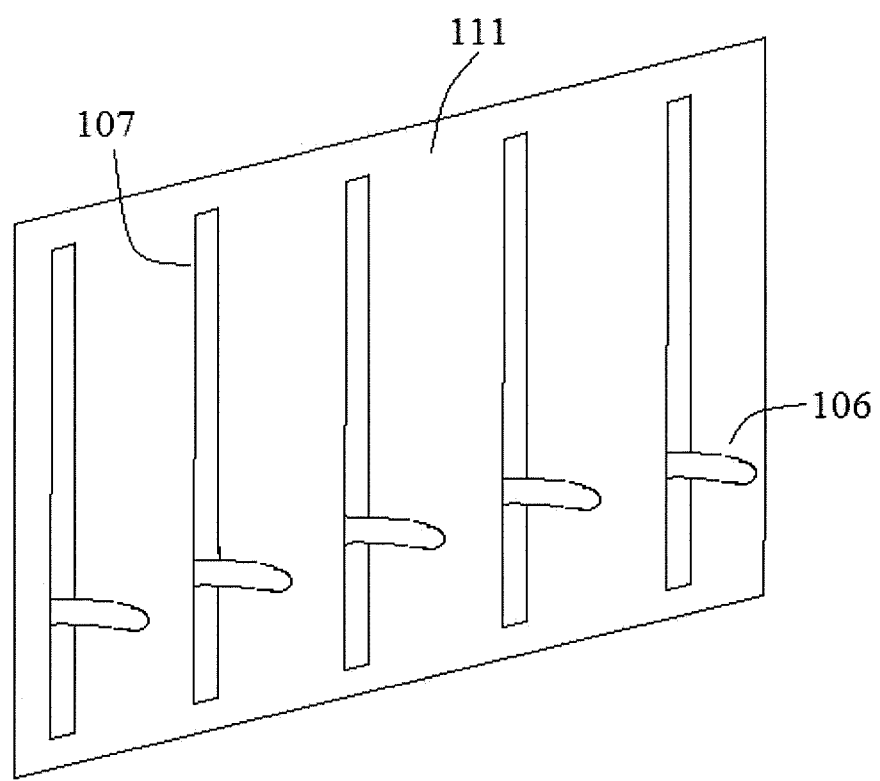
FIG. 6 depicts a potential embodiment of a feeding tube wall with finger slots and fingers beginning to be laterally extracted out of the feeding tube.

FIG. 6 shows the fingers 106 being laterally extracted from through the finger slots 107 and removed or substantially removed from the feeding tube 109. At this point, the cam mechanism 108 returns the fingers 106 to the upper portion of the feeding tube 109 and begins to reinsert the fingers 106 as shown in FIG. 3.

Figure 7:
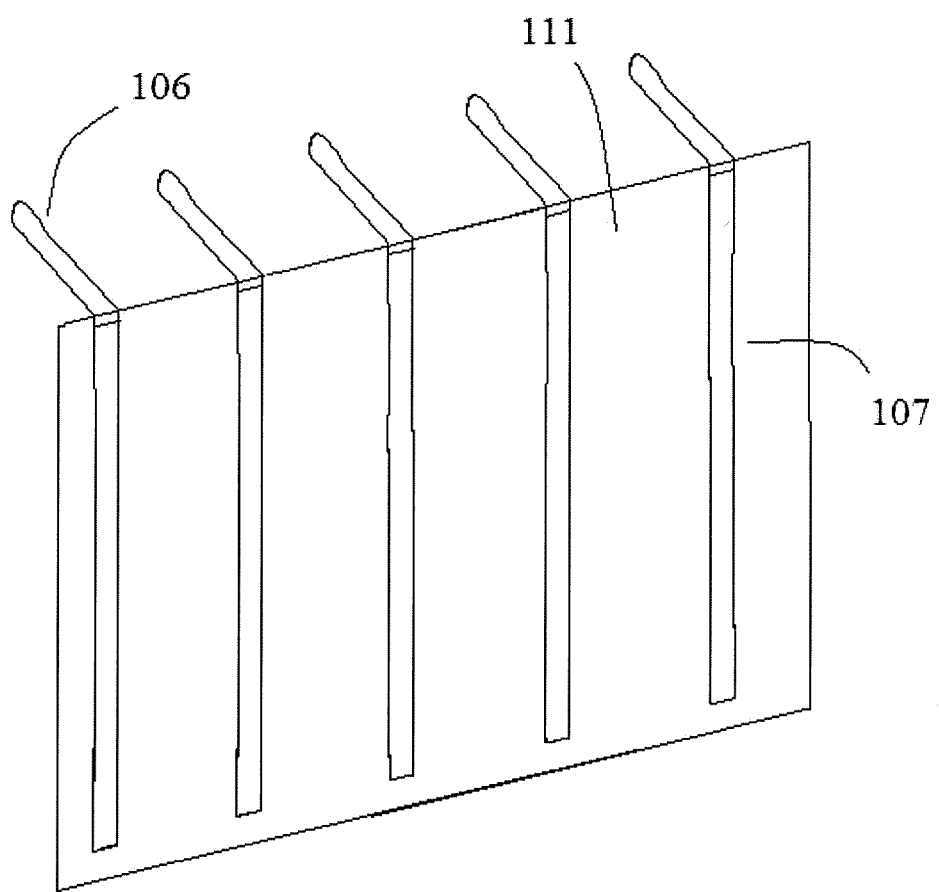
FIG. 7 depicts a potential embodiment of a feeding tube wall with finger slots and fingers beginning to rotate to the top of the feeding tube.
Figure 8:
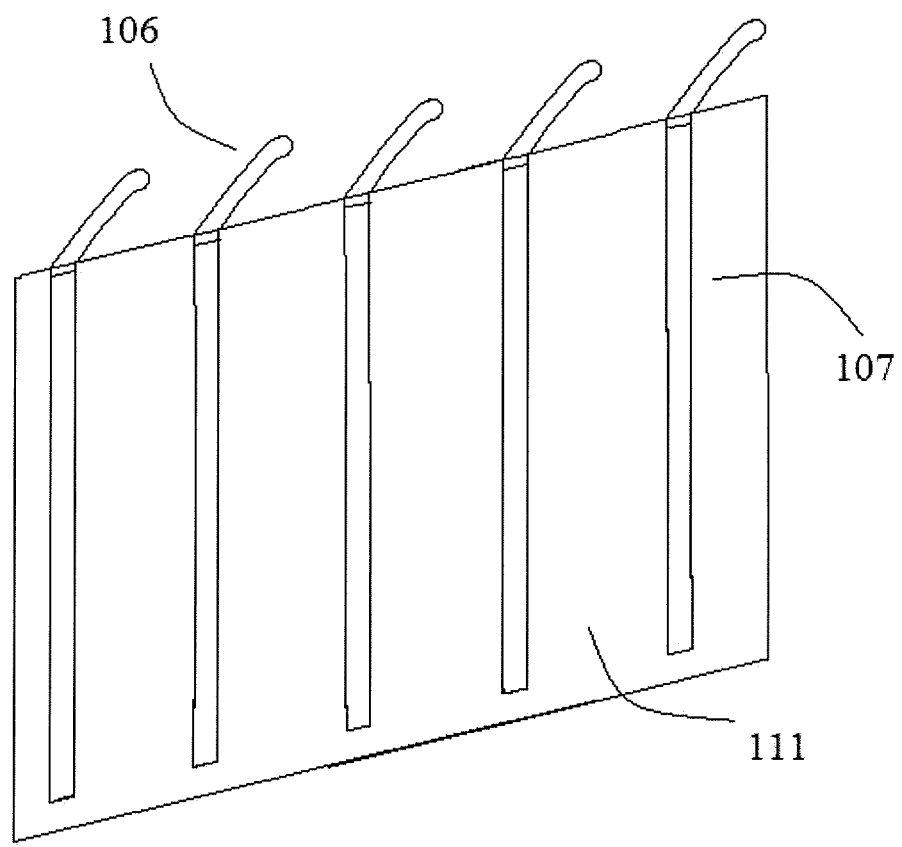
FIG. 8 depicts a potential embodiment of a feeding tube wall with finger slots and fingers continuing to rotate to the top of the feeding tube.
Figure 9:
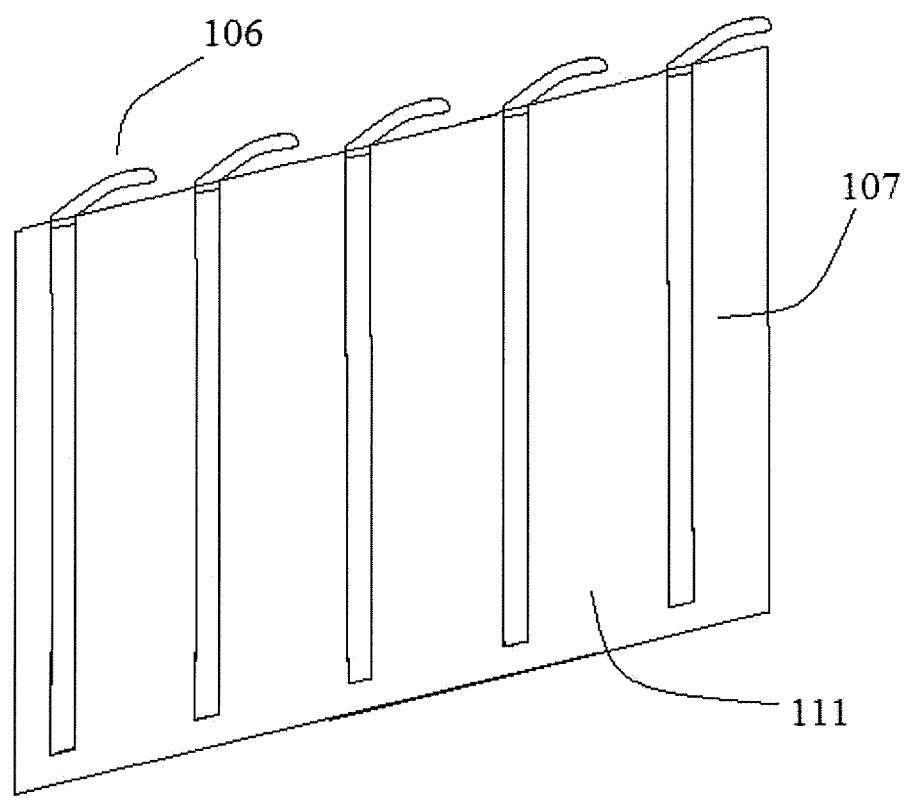
FIG. 9 depicts a potential embodiment of a feeding tube wall with finger slots and fingers rotated into position at the top of the feeding tube.

FIG. 7 through FIG. 9 show an alternate potential embodiment returning the fingers 106 to the upper portion of the feeding tube 109. In this embodiment, the fingers rotate over the top of the feeding tube wall 111 and the cam mechanism 108 lowers the fingers 106 to compress materials as described.

Figure 10:
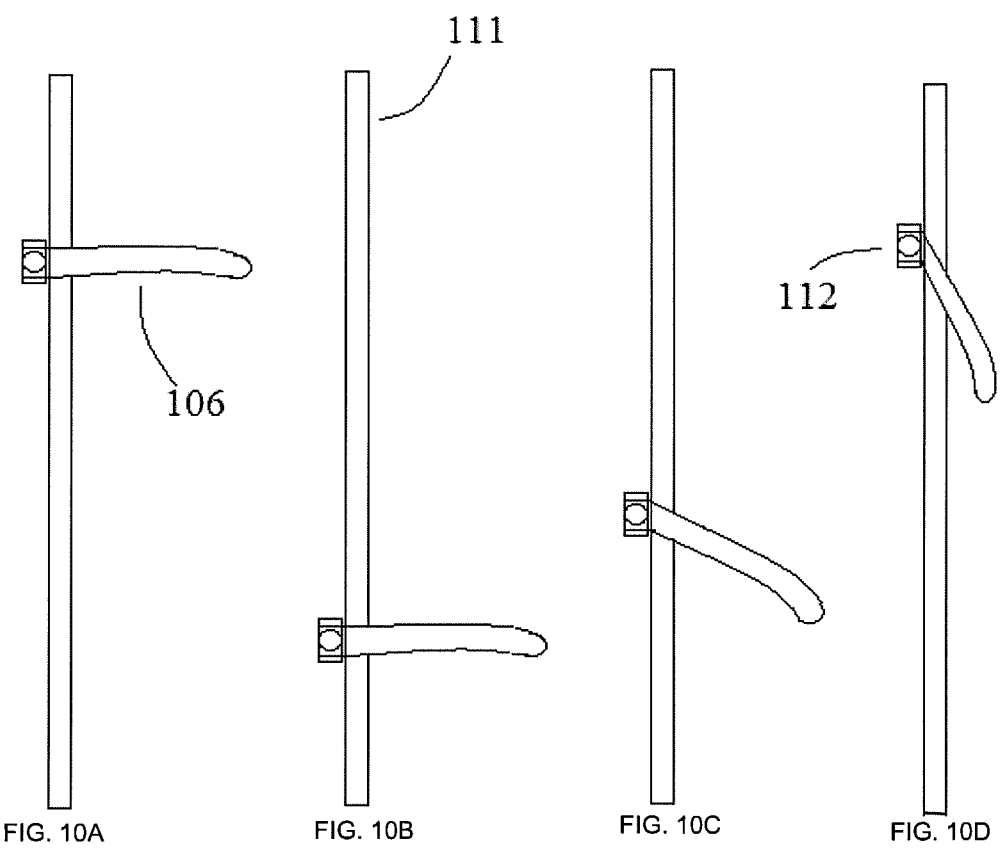
FIG. 10A depicts a potential embodiment of a feeding tube wall with fingers hinging from a finger carriage.
FIG. 10B depicts a potential embodiment of a feeding tube wall with fingers hinging from a finger carriage. In this figure the fingers are lower on the wall.
FIG. 10C depicts a potential embodiment of a feeding tube wall with fingers hinging from a finger carriage. In this figure the fingers are starting to pivot as they rise.
FIG. 10D depicts a potential embodiment of a feeding tube wall with fingers hinging from a finger carriage. In this figure the fingers have pivoted further as the finger carriage rises.
Figure 11:
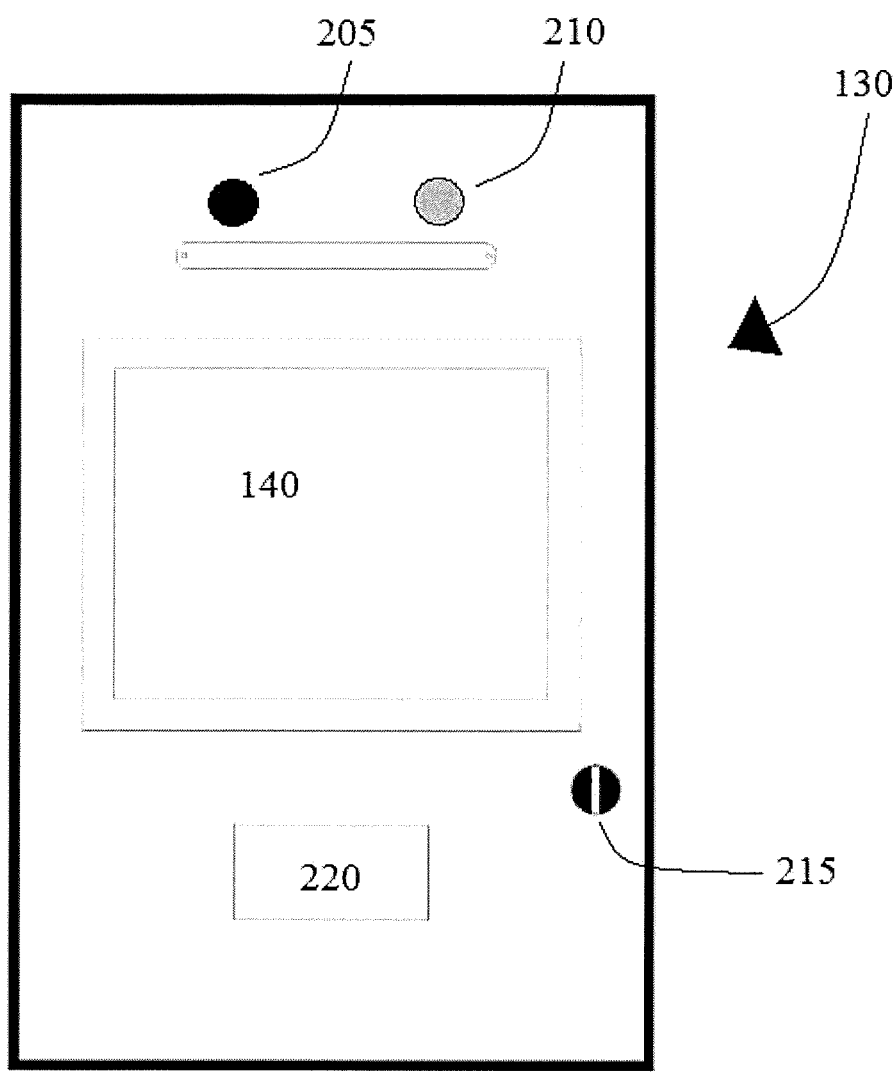
FIG. 11 depicts a potential embodiment of a smart control panel with weight indicator lights and a control panel.
Figure 12:
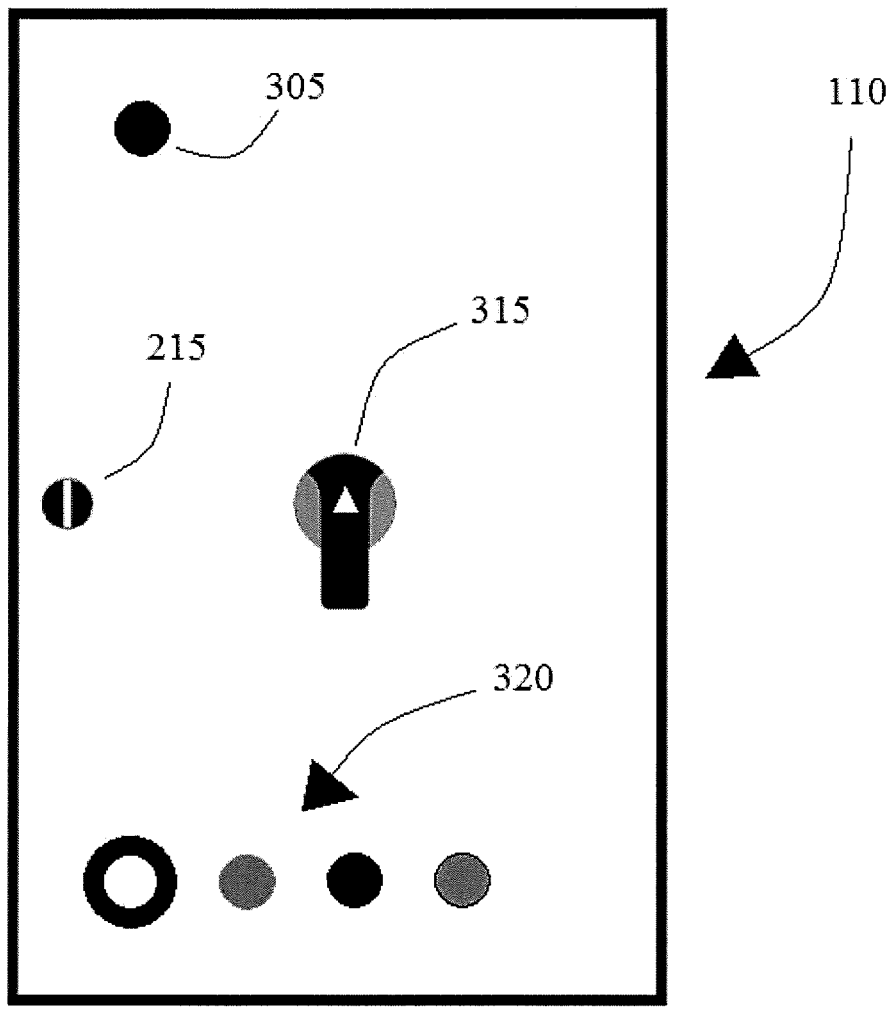
FIG. 12 depicts a potential embodiment of a traditional control panel for operating a baler.
Figure 13:
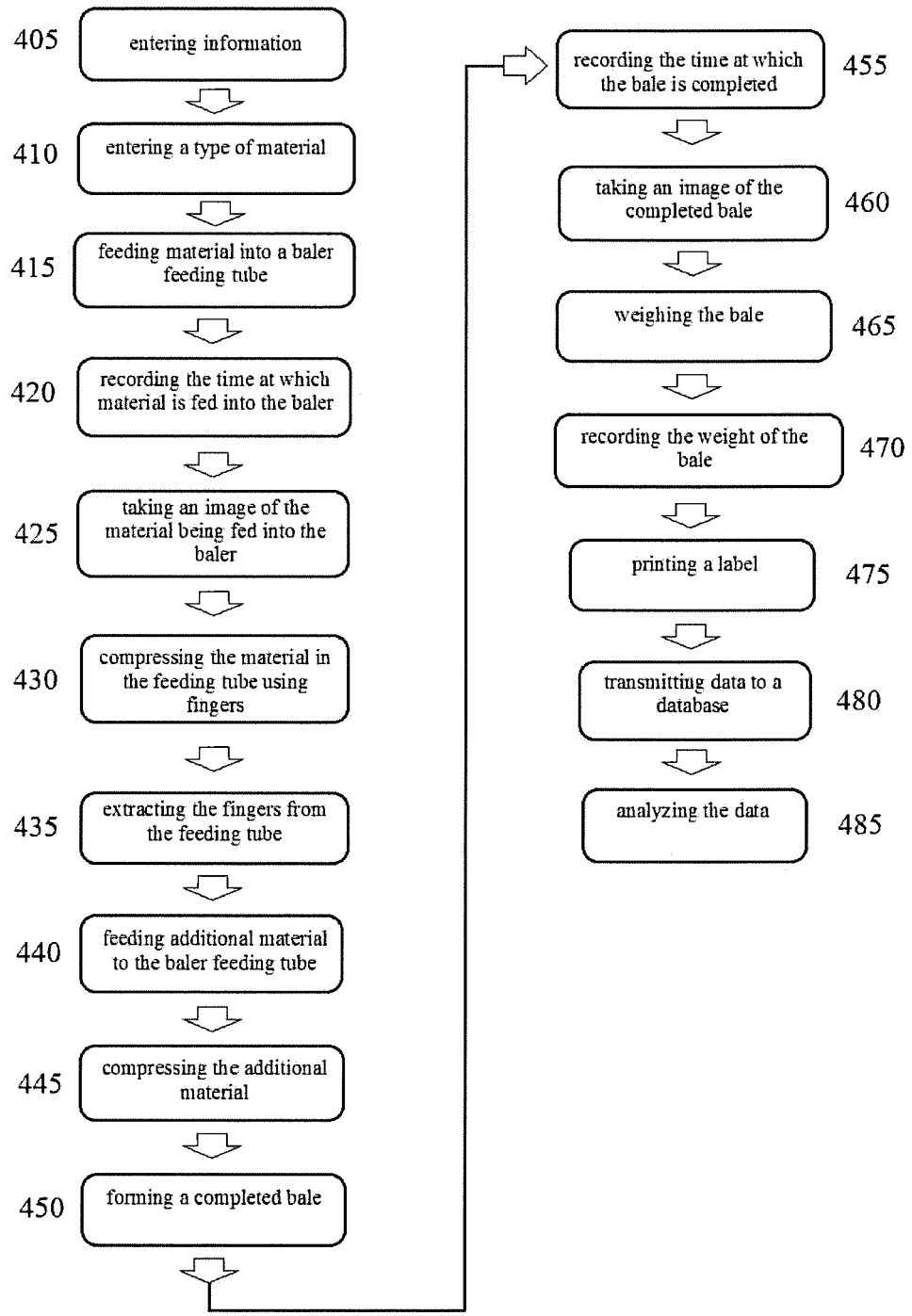
FIG. 13 depicts a potential method of baling materials.

FIG. 10 shows another potential embodiment which does not rely on laterally extracting the fingers 106 from the feeding tube 109 entirely. In this embodiment, the fingers 106 compress material as previously discussed and shown in FIGS. 10A and 10B. Then the fingers 106 fold down in order to allow any additional material that was added to the feeding tube 109 while the fingers 106 were compressing the previously added material to settle on top of the previously compressed material. In this and other embodiments, the fingers are connected to the cam mechanism 108 through a finger carriage 112. As is shown in FIGS. 10C and 10D, when the finger carriage 112 is raised back up to the upper portion of the feeding tube 109, the finger 106 folds down, substantially removing it from the center of the feeding tube 109. Once the finger carriage 112 has returned to the upper portion of the feeding tube 109, the fingers 106 are extended in order to compress any uncompressed material.

Many disclosed embodiments take advantage of smart technology such as integrated scales, processors, input devices, imagine devices, printers and more. These embodiments help ensure that collected data can be used to increase material handling efficiency. This is done by eliminating the need to weigh bales via a separate floor scale, as well as eliminating human hand writing recording errors, inaccurate material reporting and false data. Disclosed embodiments add transparency to the measurements of baler productivity, identifying which employee baled which materials, knowing when a material was baled, knowing at what location a material was baled, etc. Disclosed embodiments may encompass, without limitation, horizontal and vertical balers.

Baling devices commonly include a large hollow space or feeding tube 109 enclosed by a safety gate 125 and a door 120. Material is loaded into the feeding tube 109 and compressed by the fingers 106. Some balers 101 utilize a safety mechanism which requires the door 120 to be locked using a door lock wheel 115 or other mechanism prior to compressing the material in to a bale. Balers 101 commonly have floor gaps 135 which facilitate the insertion of baling wire under the compressed material so that the bale can be tied and completed. Balers 101 are commonly controlled by a standard control panel 110 which contains finger controls 320, a power indicator 305, a power disconnect 315, and/or a panel door lock 215. Disclosed embodiments may also contain a separate or integrated smart control panel 130. The smart control panel 130 may house a computer processor 160 which may be operably connected to a scale 145, display screen 140, imaging device 170 such as a camera, other sensors and/or baler controls. Balers 101 are commonly anchored in place using mounting bolts which may be arranged to orient the baler 101 in a fixed level position. Some disclosed embodiments will provide a minimum weight indicator 205 and a maximum weight indicator 210. Embodiments may also contain a separate or integrated weight display 220 which provides the operator with the current weight of the material being baled.

Disclosed embodiments address a wide array of concerns by incorporating sensors, imaging devices 170, computers 160, with balers 101 in order to increase the amount and reliability of data collected. The scales 145 detect the weight of a finished bale and, in some embodiments, the data is pushed to a cloud database. Additionally, a local computer 160 may capture weight data as well as images of the product baled and the finished bale. The local computer 160 will be attached to an input device 165 which allows the operator to input data that may not be readily detectable by certain embodiments. The input device 165 will commonly be a keyboard or touch pad, but a mouse, track pad, magnetic card reader, barcode scanner, QR code scanner, RFID reader or other computer input device 165 may also be used.

Embodiments will also comprise a printer 175. The printer 175 will commonly be a label printer. The label printer 175 may print up to all known data regarding a bale and may also encapsulate this data in the form of a tracking device 180 such as a barcode, QR code or RFID chip. An operator can attach the printed label to the finished bale, thereby ensuring that an accurate record of the bale information accompanies the bale through each step of the recycling chain. In preferred embodiments, the label printer 175 will print onto adhesive stickers so that the labels may be quickly adhered to the bales or bale wrapper without the need for an additional attachment mechanism.

The addition of a tracking device 180, such as a barcode, QR code or RFID, allows for fast and accurate inventory when bales are moved from trucks or other transition points in the recycling chain or possibly moved between storage areas. Certain preferred embodiments use an RFID or other near-field labeling technology to label each bale with some or all of the collected data relating to the bale. This can greatly facilitate accurate inventory control and bale monitoring. If RFID chips are used to label each bale, a truck or storage location equipped with an RFID reader can tally each bale moved into and out of the truck or storage location with minimal human involvement.

By centralizing all of this data in a single point or database, such as a cloud database, a coordinated and detailed analysis of all recyclable materials for a given enterprise can be created and maintained with relatively little human input. This data may also be accessible at any time and/or from any location by logging into the database. This big data approach to managing recyclable materials allows for the identification of inefficiencies at both individual baling stations as well as enterprise wide operations. All of this data may be collected using disclosed embodiments of a baler 101 with integrated or associated sensors.

Smart Baler Example

When raw recyclable materials are delivered to a baling location, a human operator initially enters his personal identifier (such as an employee number) and the type of material being baled into a computer 160 using an input device 165. The computer 160 will note the start time for the bale. The operator then begins the process of feeding material into the baler 101. The operator can cause the fingers 106 to begin compressing material. While the fingers 106 are still compressing the material, the operator can place additional material into the feeding tube 109 which will rest on top of the fingers 106. When the fingers 106 have completed compressing the original material, they will be extracted through the finger slots 107 in a side wall of the feeding tube 109. The fingers 106 will then begin compressing the newly added material beginning at the top of the feeding tube 109. The operator may continuously add material to the baler while the fingers 106 are compressing the added material, repeating the steps of adding material and compressing the added material as needed. This eliminates the down time of waiting for the piston to rise before adding new materials to the baler. Once the bale has reached a minimum predetermined weight threshold, the smart baler 101 notifies the operator. This may be accomplished using a minimum weight indicator 205, or any other notification device, such as an audible device or a visual indicator. The operator can then complete the bale or add additionally material to the bale as long as the bale does not exceed a maximum predetermined weight threshold. The operator may observe the weight display 220 in order to facilitate adding the appropriate amount of material. Some embodiments will display the current weight of the bale in real time in order to assist the operator. If the operator exceeds the predetermined amount of material, maximum weight indicator 210 or any other notification device, such as an audible device or a visual indicator may alert the operator to the situation. Certain embodiments of the baler 101 may cease compressing and default to a safe position if the maximum weight threshold is exceeded. This will allow the operator to safely remove some of the added material before completing the bale. Embodiments may additionally or alternatively physically or otherwise block the operator's ability to load more material once a predetermined threshold has been met in order to facilitate a more consistent bale weight.

Once a bale is completed, the computer 160 will note the end time of the bale and automatically weigh the bale. The bale may be completed using baling wire, twine, plastic wrap, or other baling materials known in the art. An integrated camera 170 may also take at least one image or picture of the completed bale. This may be used to confirm that the operator correctly entered information such as the type of material being baled. In some embodiments, a camera 170 may also take periodic pictures of the material as it is being fed into the baler 101. In a potential embodiment, computer vision techniques may be used to analyze pictures of the material being loaded and/or pictures of the complete bale in order to automatically confirm that the operator correctly identified the material being baled. In certain embodiments, an alarm or other notification may alert the operator if the computer vision system determines that the material being baled has not been correctly identified. In additional embodiments, the computer vision system may make an independent determination of the material being baled and record that information with the other collected data related to a particular bale.

The label printer 175 is configured to automatically print a label in response to the bale being completed or may print a label in response to a command by the operator. The label identifies at least the weight of the bale and the type of material from which the bale is made. The label may also include a unique bale identifier as well as any and all other information related to the bale that has been collected. The label printer 175 may print this information in a format readable by a human operator, and/or may print a machine readable code such as a barcode or QR code which is correlated with all of the stored data related to that baler 101. In some embodiments, the label printer 175 may also use RFID chips to identify the bale and all of the gathered data related to the bale.

Once completed, the bale may be removed to either on-site storage or loaded onto a truck for transportation or further processing depending on the particular circumstances.

The collected data related to a particular bale may be used in combination with other collected data and information to analyze the productivity of the baler 101, the operator and/or the enterprise across many diverse metrics. For example, the average length of time it takes any particular operator to load a bale of a particular material may be calculated. This time may be compared with other operators at the same location and/or different locations. That information may be used to increase efficiency, manage staff and/or identify the most and least productive employees. If a single operator works at multiple locations, comparing his average bale time at each location may reveal logistical issues that allow the operator to work more or less efficiently at a given location.

The collected data could also be used to determine which materials may be formed into bales faster and slower. This analysis could be used to guide the enterprise towards focusing on the recyclable material that has a higher resale value and lower cost of producing the bale both in terms of man hours and equipment necessary. The collected data could also be combined with additional sources of information in order to identify market and pricing information. This analysis may be used in order to prioritize which materials are recycled and/or make decisions regarding what to do with baled materials.

The person of ordinary skill in the art will understand that the above examples are only a few of the many possible metrics that can be analyzed. There are many additional metrics and procedures that may be analyzed once a sufficient amount of data has been collected.

Data collected may relate to company, region, and/or branch ID; machine ID; employee ID; operator ID; bale ID; product type; bale image; bale count; bale type; bale minimum and maximum weight allowed; date and time a bale is made; bale weight, type of material being recycled, source of the material being recycled, bale start time, bale completion time, baler inactivity start and end time; baler inactivity duration; location of the smart baler, time and date the bale was made, bale weight, and/or all relevant baler settings. All collected data may further be aggregated, analyzed, and compared in order to generate additional data for further analysis.

Additionally, any step in the recycling process which requires human data recording or reporting may be automated, thereby preventing human error or falsification of records. All collected data may be stored locally but will, preferably, be pushed to a cloud or other database where it can be aggregated and further analyzed. Most preferably, this data will be pushed to a remote database in real time, facilitating the management of enterprise level recycling operations and allowing for the optimization of each step in the recycling chain.

Disclosed embodiments relate to an apparatus for baling materials comprising a baler for baling materials, wherein the baler comprises a feeding tube for loading material into the baler, a plurality of fingers for compressing the materials, said fingers capable of being extracted from the feeding tube through a plurality of finger slots disposed in a first wall of the feeding tube; a scale with digital signal output; a processor operably connected to said scale; and an input device operably connected to the processor. Additional embodiments may comprise a second plurality of fingers for compressing the materials, the second plurality of fingers capable of being substantially extracted from the feeding tube through a second plurality of finger slots disposed in a second wall of the feeding tube opposite from the first wall of the feeding tube.

Embodiments may further comprise at least one digital camera, wherein the digital camera is operably connected to the processor; a display screen; and/or at least one printer, wherein the printer is operably connected to the processor or wherein the printer is configured to dispense a radio frequency identification tags. In some embodiments, the computer is configured to transfer data to a database; the database is cloud based; and/or the processor is programmed to notify the operator if the scale signal is outside of a predetermined range.

Other embodiments relate to a method for baling recyclable materials comprising the steps of entering information 405, entering a type of material 410, feeding material into a baler feeding tube 415, recording the time at which material is fed into the baler 420, taking an image of the material being fed into the baler 425, compressing the material in the feeding tube using fingers 430, extracting the fingers from the feeding tube 435, feeding additional material to the baler feeding tube 440, compressing the additional material 445, forming a completed bale 450, recording the time at which the bale is completed 455, taking an image of the completed bale 460, weighing the bale 465, recording the weight of the bale 470, printing a label 475, transmitting data to a database 480, and analyzing the data 485.

Additional embodiments relate to a method for baling recyclable materials comprising the steps of: feeding materials into a baler, wherein the baler comprises a feeding tube and a plurality of fingers and is operably connected to a processor; compressing the materials using the plurality of fingers, wherein the fingers are capable of being substantially extracted from the feeding tube through a plurality of finger slots disposed in a wall of the feeding tube; forming a completed bale; weighing the bale automatically using a digital scale operably connected to the processor; recording the weight of the bale automatically; and printing a label which displays the recorded weight of the bale.

Some embodiments may further comprise the steps of adding additional materials while the materials are being compressed by the plurality of fingers; entering an operator identification into the processor using an associated input device; entering the type of material being fed into the baler; taking an image of the material being fed into the baler; taking an image of the completed bale; and/or automatically transmitting the data associated with a bale to a remote database.

In certain embodiments, the processor automatically records the time at which material is initially fed into the baler and the time at which the completed bale is formed.

Alternative embodiments relate to an alternate method for baling recyclable materials comprising the steps of: feeding materials into a baler, wherein the baler comprises a feeding tube and a plurality of fingers and is operably connected to a processor, the fingers having a first end attached to a finger carriage near the feeding tube wall and a second end disposed within the interior of the feeding tube; compressing the materials using the plurality of fingers, wherein the fingers are capable of hinging at the finger carriage, such that as the first end of the fingers is raised, the second end hinges down, thereby allowing material that is resting on top of the extended fingers to fall down as the fingers fold out of the way; adding additional material while the materials are being compressed; raising the fingers first end while folding down the fingers second end in order to allow the added material to fall down on top of the previously compressed materials; forming a completed bale; weighing the bale automatically using a digital scale operably connected to the processor; recording the weight of the bale automatically; and printing a label which displays the recorded weight of the bale.

Certain embodiments also comprise the step of entering the type of material being fed into the baler.

In some embodiments, processor automatically records the time at which material is initially fed into the baler and the time at which the completed bale is formed.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. An apparatus comprising:
    a baler for baling materials, wherein the baler comprises
        a feeding tube for loading the materials into the baler,
        a first plurality of fingers for compressing the materials,
        said fingers capable of being extracted from the feeding tube through a first plurality of finger slots disposed in a first vertical wall of the feeding tube wherein the first vertical wall of the feeding tube has an upper portion above the first plurality of finger slots such that the fingers cannot be extracted vertically from the first plurality of finger slots;

a cam mechanism for driving the motion of the fingers wherein the fingers are hinged to fold down and the baler is configured such that the folded down fingers are raisable to the upper portion of the first vertical wall of the feeding tube while disposed in the first vertical wall;

a motor, operably connected to the cam mechanism;

a scale with digital signal output;

a processor operably connected to said scale; and an input device operably connected to the processor;

wherein the first plurality of fingers for compressing the materials are wider than the first plurality of finger slots in one dimension and wherein the first plurality of fingers for compressing the materials are thinner than the first plurality of finger slots in another dimension such that the first plurality of fingers for compressing the materials can be inserted and extracted through the first plurality of finger slots and wherein the first plurality of fingers for compressing the materials are axially rotatable such that upon insertion through the plurality of finger slots the fingers are rotatable such that the wider Portion is configured to compress the materials.

2. The apparatus of claim 1, further comprising a second plurality of fingers for compressing the materials, the second plurality of fingers capable of being extracted from the feeding tube through a second plurality of finger slots disposed in a second wall of the feeding tube.

3. The apparatus of claim 1, further comprising at least one digital camera, wherein the digital camera is operably connected to the processor.

4. The apparatus of claim 1, further comprising at least one printer, wherein the printer is operably connected to the processor.

5. The apparatus of claim 1, wherein the processor is configured to transfer data to a database.

6. The apparatus of claim 5, wherein the database is cloud based.

7. The apparatus of claim 1, wherein the processor is programmed to notify the operator if the scale digital signal output is outside of a predetermined range.

8. An apparatus comprising:
a baler for baling materials, wherein the baler comprises a feeding tube for loading the materials into the baler, a first plurality of fingers for compressing the materials, said fingers capable of being extracted from the feeding tube through a first plurality of finger slots disposed in a first vertical wall of the feeding tube wherein the first vertical wall of the feeding tube has an upper portion above the first plurality of finger slots such that the fingers cannot be extracted vertically from the first plurality of finger slots;

a cam mechanism for driving the motion of the fingers;

a motor, operably connected to the cam mechanism;

a scale with digital signal output;

a processor operably connected to said scale;

an input device operably connected to the processor; and a printer configured to dispense radio frequency identification tags;

wherein the first plurality of fingers for compressing the materials are wider than the first plurality of finger slots in one dimension and wherein the first plurality of fingers for compressing the materials are thinner than the first plurality of finger slots in another dimension such that the first plurality of fingers for compressing the materials can be inserted and extracted through the first plurality of finger slots and wherein the first plurality of fingers for compressing the materials are axially rotatable such that upon insertion through the plurality of finger slots the fingers are rotatable such that the wider Portion is configured to compress the materials.

9. A method comprising the steps of:

feeding material into a baler, wherein the baler comprises a feeding tube and a plurality of fingers and wherein the baler is operably connected to a processor;

compressing the materials using the plurality of fingers, wherein the fingers are hinged to fold down and wherein the baler is configured such that the folded down fingers are raisable to an upper portion of a first vertical wall of the feeding tube while disposed in a plurality of finger slots in the first vertical wall of the feeding tube wherein the upper portion of the first vertical wall above the first plurality of finger slots is configured such that the fingers cannot be extracted vertically from the first plurality of finger slots;

adding waste while compressing the materials and then folding down the fingers while the fingers are disposed in the plurality of finger slots in the first wall of the feeding tube such that added waste settles on top of compressed materials;

forming a completed bale; and weighing the bale using a digital scale operably connected to the processor;

wherein the plurality of fingers are wider than the plurality of finger slots in one dimension and wherein the plurality of fingers are thinner than the plurality of finger slots in another dimension such that the plurality of fingers can be inserted and extracted through the plurality of finger slots and wherein the plurality of fingers are axially rotatable such that upon insertion through the plurality of finger slots the fingers are rotatable such that the wider portion is configured to compress the materials.

10. The method of claim 9, further comprising the steps of recording the weight of the bale automatically.

11. The method of claim 10, further comprising printing a label which displays the recorded weight of the bale.

12. The method of claim 9, further comprising the step of entering an operator identification into the processor using an associated input device.

13. The method of claim 9, wherein the processor records the time at which material is initially fed into the baler and the time at which the completed bale is formed.

14. The method of claim 9, further comprising the step of taking an image of the completed bale.

* * * * *